Feb. 22, 1944.　　　　L. E. SHAW　　　　2,342,604

VARIABLE SPEED TRANSMISSION

Filed Jan. 9, 1942　　　3 Sheets-Sheet 1

Louis Eaton Shaw
INVENTOR

BY
ATTORNEY

Feb. 22, 1944.   L. E. SHAW   2,342,604
VARIABLE SPEED TRANSMISSION
Filed Jan. 9, 1942   3 Sheets-Sheet 3
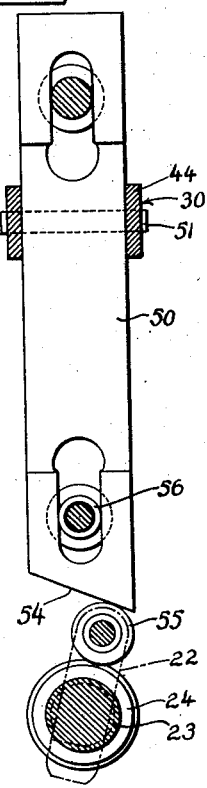
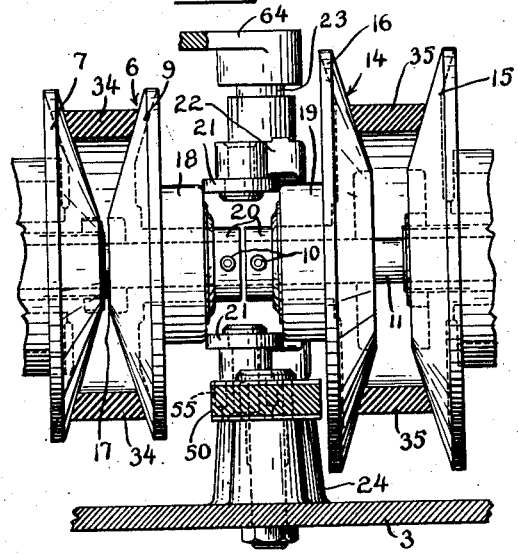
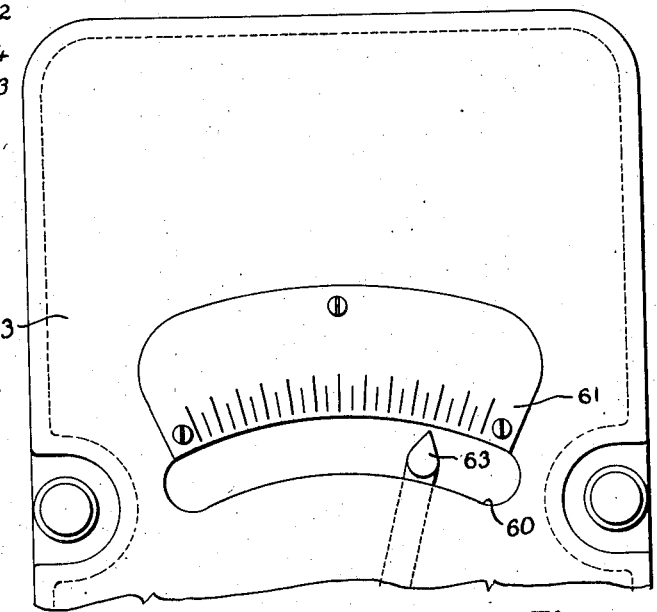
Louis Eaton Shaw
INVENTOR Patented Feb. 22, 1944

2,342,604

UNITED STATES PATENT OFFICE 2,342,604

VARIABLE SPEED TRANSMISSION

Louis Eaton Shaw, East Orange, N. J.

Application January 9, 1942, Serial No. 426,114

12 Claims. (Cl. 74—230.17)

This invention relates to variable speed transmissions of the V-belt type in which a driving member is in driving, belted relation with a driven machine member through the agency of a speed adjuster or changer including a pair of expansible sheaves having V-belts engaging them and wherein by varying the radius of the arc which the belts travel around their associated expansible sheaves, the speed ratio between the driving and driven members may be varied at will.

In drives of the type outlined, embodying expansible driving and driven sheaves which are connected in power transmission relationship through intermediate expansible transmission sheaves carried by a jack or counter-shaft, the center distances between the driving and driven sheaves and the counter-shaft varies with variation of the radii of the arcs which the belts travel around their associated expansible sheaves, causing slack in the belts with resultant slippage, excessive wear on the belts, and a decrease in the efficiency of the drives.

The primary object of the present invention is to provide, in a drive of the type specified, positive acting mechanical means operable in concert with the shifting of the shiftable sections of the expansible sheaves to vary the distance between the centers or axes of the driving and driven shafts and of the counter-shaft, assuring proper tension on the belts at all times and providing variation of the center distances between the shafts in a smooth, positive manner, free from shocks or sudden movements of the counter-shaft and the pulleys or sheaves carried thereby.

With these and other objects in view, as may appear from the accompanying specification, the invention consists of various features of construction and combination of parts, which will be first described in connection with the accompanying drawings, showing a variable speed transmission of the preferred form embodying the invention, and the features forming the invention will be specifically pointed out in the claims.

In the drawings:

Figure 3 is a detail sectional view taken on the line 3—3 of Figure 2.

Figure 4 is a detail sectional view taken on the line 4—4 of Figure 1.

Figure 5 is a detail view of a part of the outside housing of the drive.

Figure 1:
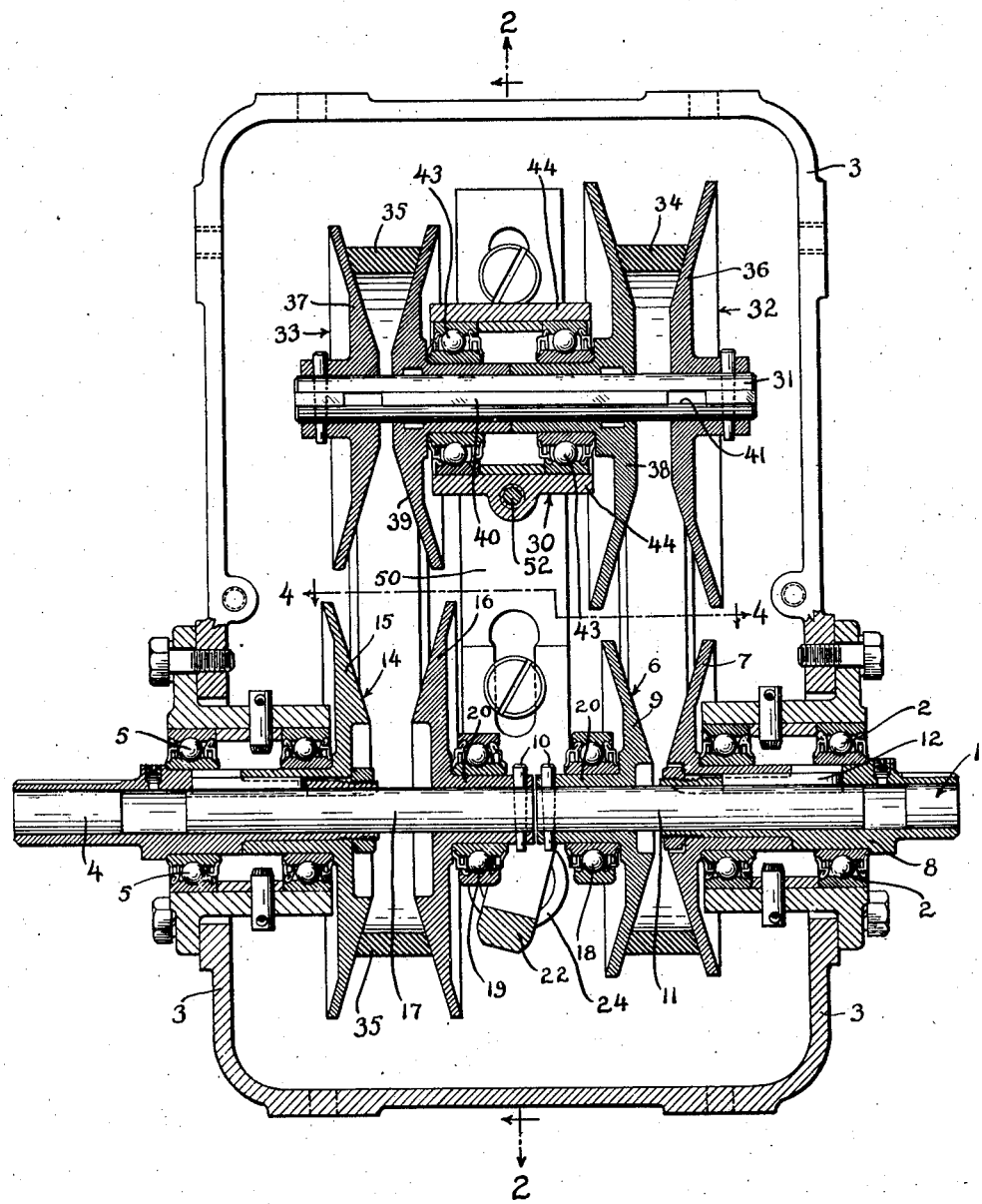
Figure 1 is a horizontal sectional view through the improved drive taken on the line 1—1 of Figure 2.
Figure 2:
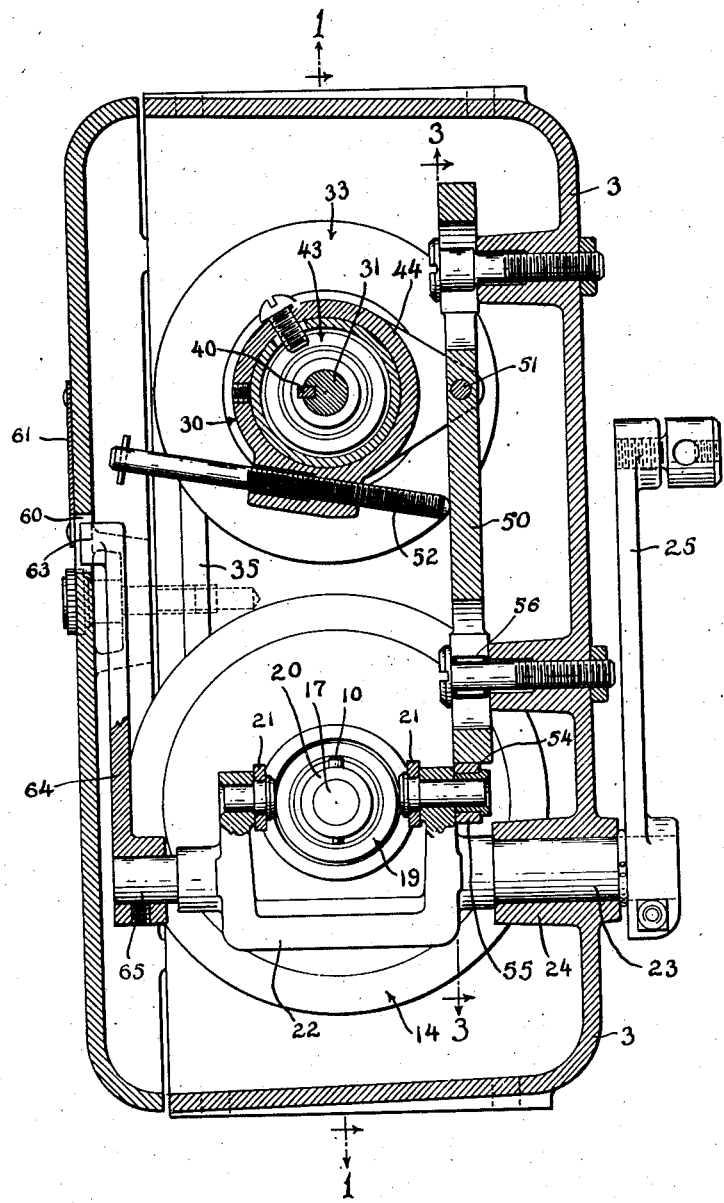
Figure 2 is a vertical sectional view through the improved drive taken on the line 2—2 of Figure 1.

Referring more particularly to the drawings, the improved variable speed transmission comprises a driving shaft 1 rotatably supported by suitable bearing structures 2 carried by the housing 3, and a driven shaft 4 which is also rotating 3, and a driven shaft 4 which is also rotatably supported by suitable bearings 5 carried by the housing 3. The driving shaft 1 has an expansible sheave 6 mounted thereon for rotation therewith which sheave comprises the sheave section 7 mounted rigidly upon the hollow section 8 of the driving shaft 1 for rotation therewith, and the second, cooperating sheave section 9. This second sheave section 9 is movable axially relative to the sheave section 7 for varying the width of the V-groove of the sheave as formed by the facing sides of the sheave sections 7 and 9. The sheave section 9 is pinned, by means of a pin 10, to the stub shaft 11, which latter is connected to the hollow section 8 of the driving shaft 1 by means of a key 12 for rotation with the hollow section but for longitudinal movement relative to the hollow section, so as to permit variation of the size of the V-groove of the sheave.

The driven sheave 14 is of the same construction as the driving sheave 6; that is, it comprises the sheave section 15, which is connected to the driven shaft for rotary movement therewith, and which is held against axial movement, and the movable sheave section 16. The movable sheave section 16 is carried by the stub shaft 17, the latter being connected to the driven shaft 4 for rotary movement therewith and in such manner as to permit axial movement relative to the driven shaft to vary the size of the V-groove in the sheave 14.

The movable sheave sections 9 and 16 have ball thrust bearings 18 and 19 respectively mounted upon the hubs 20 of the sheave sections. As will be noted by reference to Figure 1 of the drawings, the movable sheave sections 9 and 16 are disposed in back-to-back relation with their hubs 20 extending toward each other.

Members 21 are rotatably carried by the arms of a U-bar 22, and engage against the thrust bearings 18 and 19. The diameter of these members 21 determines the distance between the facing sides of the thrust bearings 18 and 19. The members 21 may be in the form of rollers, blocks, or other suitable structure. The U-bar 22 is journalled at one end to fit a suitable bearing 24 formed in the housing 3, and an actuating arm or lever 25 is connected to the extended portion of the trunnion 23 for rocking the U-bar 22 to shift the movable sheave sections 9 and 16 for varying the relative sizes of the V-grooves of the expansible sheaves 6 and 14 synchronously to provide variable speed ratios between the driving shaft 1 and the driven shaft 4 through the medium of the speed change unit generically indicated at 30. At its opposite end the U-bar 22 is trunnioned, as at 65, to support the indicator arm 64.

The speed change unit 30 comprises a counter or jack shaft 31 on which is mounted a driven sheave 32 and a driving sheave 33. The driven sheave 32 is connected to the driving sheave 6 by means of a V-belt 34, while the speed change sheave 33 is connected to the driven sheave 14 by means of a similar conventional form V-belt 35.

The speed change driven and driving sheaves 32 and 33 respectively are expansible, as are the driving and driven sheaves 6 and 14, being composed of sections 36 and 37, which are pinned to the counter or jack shaft 31 for rotation and axial movement therewith, together with the inner sheave sections 38 and 39, which latter two sheave sections are connected or mounted on the jack shaft 31 by means of splines or keys 40, which engage in grooves 41 in the counter shaft 31, so that the movable sheave sections 36 and 37 will rotate with the counter or jack shaft 31, but will also move longitudinally with the shaft, in opposition with and in direct proportion to or synchronously with the movement of the movable sections 9 and 16 of the driving and driven sheaves 6 and 14, respectively, under operation of the arm or lever 25, so as to vary the speed ratio between the driving sheave 6 and the driven sheave 14 in direct proportion to the variation of the sizes of the V-grooves in the sheaves and the consequent variation in the arc radii of the V-belts as they pass about the sheaves.

The counter or jack shaft 31 is rotatably supported by means of suitable bearings 43 and a supporting member 44, which latter is pivotally attached to a bar 50.

Adjustments of the sheaves 6 and 14 to vary the speed ratios between the driving and driven shafts 1 and 4 by regulating the width of the V-grooves in the sheaves and consequently the depth within the grooves at which the V-belts engage requires a variation, within relatively small limits however, of the distances between the axes of rotation of the arcuate ends of the belts. If no provision were made for correspondingly varying the distances between the axes of the driven and driving sheaves and of the counter or jackshaft 31, it would result either in slipping of the belts or excess stress on the belts, depending upon the directional adjustment of the sheave sections, with consequent excessive wear on the belts and decrease in efficiency of the drive. The present invention comprehends means for mechanically varying the distances between the axes of the driving and driven shafts and the axis of the counter or jack shaft in proportion to the speed changing adjustments of the sheaves so as to eliminate the disadvantages above outlined.

For the purpose of providing a positive, smooth operating, sensitive and accurate adjustment of the distances between the axes of the countershaft and the other shafts, a cam bar 50 is provided, slidably supported by the casing 3 in any suitable manner. The counter or jack shaft carrying member 44 is pivotally connected, as shown at 51, to the cam bar 50, and an adjusting screw 52 is carried by the member 44 for engaging the cam bar 50 to permit accurate adjustment of the initial normal distance between the axes of the driving and driven shafts 1 and 4 and the counter or jack shaft 31. The adjusting screw also permits variation of this distance to permit taking up of stretch in the belts when necessary.

The lower end of the cam bar 50 has a cam surface 54 formed thereon which engages the periphery of a cam or roller 55 carried by the U-bar 22. This cam or roller 55 has its axis in alignment with the axis of the members or rollers 21 which are also carried by the U-bar 22, so that the cam 55 will move in synchronism with the movement of the members 21 and consequently in unison with the movement of the movable sections 9 and 16 of the driving and driven sheaves 6 and 14. The movement of the cam 55 over the cam surface 54 of the cam bar 50 will move the cam bar longitudinally and consequently will move the counter or jack shaft 31 in direct proportion to the adjustment of the sheave sections 9 and 16 so as to vary the distance between the axes of the driving and driven sheaves 6 and 14 and the countershaft 31 for maintaining the belts 34 and 35 under the proper tension at all times. It is understood, of course, that the cam surface 54 on the cam bar 50 is accurately plotted so as to provide the proper movement of the countershaft 31 in relation to the driving and driven sheaves 6 and 14.

In the drawings a roller thrust bearing 56 is provided to absorb or take up any side thrust of the cam bar 50.

The housing 3 is provided with an arcuate slot 60, and with a graduated scale 61 extending along one edge of said slot 60. An indicator head 63 extends into the slot 60 and is carried by an arm 64, the latter being connected to the trunnion 65 formed on the U-bar 22 for movement therewith, showing, by means of the visible indicator, the various adjusted positions of the movable sheave sections and indicating the speed change ratio adjustment thereof and enabling the operator to adjust the adjustable sheaves to provide any desired speed change ratio between the driving shaft 1 and the driven shaft 4 which is possible between the limits of the maximum and minimum speeds of the variable speed transmission.

It will be understood that the invention is not to be limited to the specific construction or arrangement of parts shown, but that they may be widely modified within the invention defined by the claims.

What is claimed is:

1. In a change speed drive of the V-belt type the combination, of an expansible driving sheave, an expansible driven sheave, a speed change device therebetween including a countershaft and expansible speed change driving and driven sheaves carried by said countershaft, belts connecting said driving and driven sheaves to said speed change sheaves, means for shifting said expansible driving and driven sheaves to vary the speed ratio therebetween, said speed change sheaves being automatically adjusted in conformity to the shifted adjustment of the driving and driven sheaves, and means operated by said shifting means for varying the distance between the axes of the driving and driven sheaves and the axes of the speed change sheaves in predetermined ratio to the speed change shifting of the driving and driven sheaves.

2. In a change speed drive of the V-belt type, the combination of an expansible driving sheave rotatable on a fixed axis, an expansible driven sheave rotatable on a fixed axis, a speed change device therebetween including a countershaft and expansible speed change driving and driven sheaves carried by said countershaft, belts connecting said driving and driven sheaves to said speed change sheaves, means for shifting said expansible driven and driving sheaves to vary the speed ratio therebetween, said speed change sheaves being automatically adjusted in conformity to the shifted adjustment of the driving and driven sheaves, and means operated by said shifting means for moving said countershaft to vary the distance between the axis of the countershaft and the axes of the driving and driven sheaves in predetermined proportion to the speed change shifting of the driving and driven sheaves.

3. In a change speed drive of the V-belt type, the combination of an expansible driving sheave, an expansible driven sheave, a speed change device therebetween including a countershaft and expansible speed change driving and driven sheaves carried by said countershaft, belts connecting said driving and driven sheaves to said speed change sheaves, means for shifting said expansible driving and driven sheaves to vary the speed ratio therebetween, said speed change sheaves being automatically adjusted in conformity to the shifted adjustment of the driving and driven sheaves, a cam movable with said shifting means, a cam bar engaging said cam and connected to said countershaft for moving said countershaft for varying the distance between the axis of the countershaft and the axes of the driving and driven sheaves.

4. In a change speed drive of the V-belt type, the combination of an expansible driving sheave, an expansible driven sheave, a speed change device therebetween including a countershaft and expansible speed change driving and driven sheaves carried by said countershaft, belts connecting said driving and driven sheaves to said speed change sheaves, means for shifting said expansible driving and driven sheaves to vary the speed ratio therebetween, said speed change sheaves being automatically adjusted in conformity to the shifted adjustment of the driving and driven sheaves, a cam movable with said shifting means, a slidable bar engaging said cam and movable by movement of the cam, means for connecting said countershaft to said cam bar for movement therewith, and adjustable means for adjusting the position of the countershaft relative to the cam bar to provide a fixed normal distance between the axis of the countershaft and the axes of the driving and driven sheaves which normal distance is determined by the lengths of said belts, said adjustable means permitting adjustment of said normal distance to compensate for stretching of the belts.

5. In a change speed drive of the V-belt type, the combination of an expansible driving sheave, an expansible driven sheave, a speed change device therebetween including a countershaft and expansible speed change driving and driven sheaves carried by the countershaft, belts connecting said driving and driven sheaves to said speed change sheaves, means for shifting said expansible driving and driven sheaves to vary the speed ratio therebetween, said speed change sheaves being automatically adjusted in conformity to the shifted adjustment of the driving and driven sheaves, means operated by said shifting means for varying the distance between the axes of the driving and driven sheaves and the axis of the countershaft in predetermined ratio the speed change shifting of the driving and to the speed change shifting of the driving and driven sheaves, adjustable means for adjusting the normal distance between the axis of the countershaft and the axes of the driving and driven sheaves, which normal distance is determined by the lengths of said belts, said adjusting means permitting adjustment of said normal distance to compensate for stretching of the belts.

6. In a change speed device of the V-belt type, the combination of an expansible driving sheave, an expansible driven sheave, a speed change device therebetween including a countershaft and expansible speed change driving and driven sheaves carried by the countershaft, belts connecting said driving and driven sheaves to said speed change sheaves, said expansible driving and driven sheaves each including a shiftable section shiftable to provide speed change ratios between the sheaves, thrust bearings carried by said shiftable sections, a shifting member, members carried by said shifting member and engaging said thrust bearings to shift the siftable members by movement of the shifting member, and means operated by said shifting member for varying the distance between the axes of the driving and driven sheaves and the axis of the countershaft in predetermined ratios to the speed change shifting of said shiftable members.

7. In a change speed device of the V-belt type, the combination of an expansible driving sheave, an expansible driven sheave, a speed change device therebetween including a countershaft and expansible speed change driving and driven sheaves carried by said countershaft, belts connecting said driving and driven sheaves to said speed change sheaves, said expansible driving and driven sheaves each including a shiftable section shiftable to provide speed change ratios between the sheaves, thrust bearings carried by said shiftable sections, a shifting member, members carried by said shifting member and engaging said thrust bearings to shift the shiftable members by movement of the shifting member, a cam carried by and movable with said shifting member, a cam bar engaging said cam and movable by movement of the cam, means connecting said countershaft to said cam bar, and adjustable means for adjusting the position of the countershaft relative to the cam bar to provide a fixed normal distance between the axis of the countershaft and the axes of the driving and driven sheaves, said adjustable means permitting adjustment of said normal distance.

8. In a change speed drive of the V-belt type, the combination, of a housing, an expansible driving sheave, an expansible driven sheave, a speed change device therebetween including a countershaft and expansible speed change driving and driven sheaves carried by said countershaft, belts connecting said driving and driven sheaves to said speed change sheaves, means for shifting said expansible driving and driven sheaves to vary the speed ratio therebetween, said speed change sheaves being automatically adjusted in conformity to shifted adjustment of the driving and driven sheaves, a cam movable with said shifting means, a cam bar slidably carried by said housing, a shaft supporting member pivotally connected to said cam bar and rotatably supporting said countershaft, and adjustable means carried by said shaft supporting member and engaging said cam bar for holding the shaft supporting member in adjusted position relative to the cam bar.

9. In a change speed drive of the V-belt type, the combination, of a housing, an expansible driving sheave, an expansible driven sheave, a speed change device therebetween including a countershaft and expansible speed change driving and driven sheaves carried by said countershaft, belts connecting said driving and driven sheaves to said speed change sheaves, means for shifting said expansible and driven sheaves to vary the speed ratio therebetween, said speed change sheaves being automatically adjusted in conformity to shifted adjustment of the driving and driven sheaves, a cam movable with said shifting means, a cam bar slidably carried by said housing, a shaft supporting member pivotally connected to said cam bar and rotatably supporting said countershaft, and adjustable means for adjusting the pivotal position of said shaft supporting member and the position of the countershaft relative to the cam bar to provide a fixed normal distance between the axis of the countershaft and the axes of the driving and driven sheaves.

10. In a change speed drive of the V-belt type, the combination, of a housing, an expansible driving sheave, an expansible driven sheave, a speed change device therebetween including a countershaft and expansible speed change driving and driven sheaves carried by said countershaft, belts connecting said driving and driven sheaves to said speed change sheaves, means for shifting said expansible driving and driven sheaves to vary the speed ratio therebetween, said speed change sheaves being automatically adjusted in conformity to shifted adjustment of the driving and driven sheaves, a cam movable with said shifting means, a cam bar slidably carried by said housing, a shaft supporting member pivotally connected to said cam bar and rotatably supporting said countershaft, and adjustable means for adjusting the pivotal position of said shaft supporting member and the position of the countershaft relative to the cam bar to provide a fixed normal distance between the axis of the countershaft and the axes of the driving and driven sheaves, said cam bar being mounted for movement only in a path at right angles to the longitudinal axis of the countershaft and the longitudinal axes of said driving and driven sheaves.

11. A stepless change speed transmission comprising a rotatable incoming-power shaft, a rotatable outgoing-power shaft, four rotatable variable conical disc pulleys, each variable conical disc pulley including an axially immovable and an axially movable cone, the first of said pulleys being associated with said incoming-power shaft, the axially movable and the axially immovable cones of the second and third of said pulleys being connected with each other so as to form an intermediate duplex variable conical disc pulley, a countershaft carrying said intermediate duplex pulley, said countershaft being movable relative to said incoming-power shaft and outgoing-power shaft for a variation in the distance between the axis of the countershaft and the axes of the incoming-power and outgoing-power shafts, the fourth of said pulleys being associated with said outgoing-power shaft, a first wedge-shaped belt trained around said first and second pulleys, a second wedge-shaped belt trained around said third and fourth pulleys, and controlling means arranged for a simultaneous positive control of at least one of the movable cones of the first and fourth pulleys and of the movable countershaft.

12. A stepless change speed transmission comprising a rotatable incoming-power shaft, a rotatable outgoing-power shaft, four rotatable variable conical disc pulleys, each variable conical disc pulley including an axially immovable and an axially movable cone, the first of said pulleys being associated with said incoming-power shaft, the axially movable and the axially immovable cones of the second and third of said pulleys being connected with each other, so as to form an intermediate duplex variable conical disc pulley, a countershaft carrying said intermediate duplex pulley, the fourth of said pulleys being associated with said outgoing-power shaft, a supporting member carrying said countershaft, said supporting member being movably arranged for a variation in the distance between the axis of the countershaft and the axes of the incoming-power shaft and outgoing-power shaft, a first wedge-shaped belt trained around said first and second pulleys, a second wedge-shaped belt trained around said third and fourth pulleys, and controlling means associated with the axially movable cones of the first and fourth pulleys and with said supporting member for a positive displacement of at least one of the movable cones of said first and fourth pulleys simultaneously with a positive control of said movable supporting member.

LOUIS EATON SHAW.